LOW NOISE GATED D.C. AMPLIFIER
Filed Sept. 1, 1966
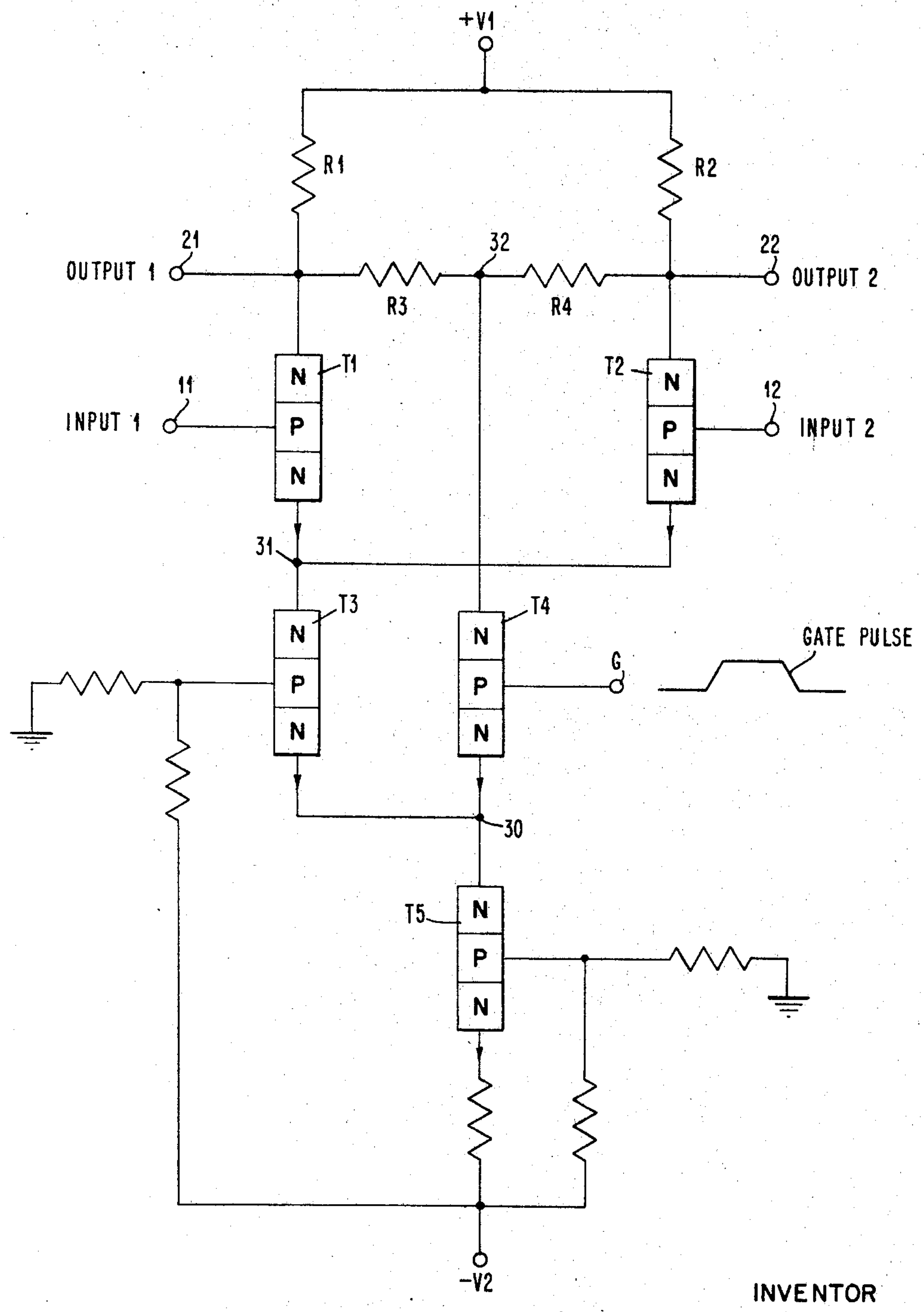
INVENTOR
PETER PLESHKO
BY Charles P. Boberg
ATTORNEY United States Patent Office 3,505,539

Patented Apr. 7, 1970

3,505,539

LOW NOISE GATED D.C. AMPLIFIER

Peter Pleshko, Waldwick, N.J., assignor to International Business Machines Corporation, Armonk, N.Y., a corporation of New York Filed Sept. 1, 1966, Ser. No. 576,731
Int. Cl. H03k 17/60
U.S. Cl. 307—254 6 Claims

ABSTRACT OF THE DISCLOSURE

My invention is a gated, D.C., differential amplifier which minimizes gating noise on the output lines. It is easily integrated because it is designed for direct connection to the next stage and is made of resistors and one type of transistor.

This invention relates to transistor amplifiers, and particularly to gated transistor amplifiers.

Amplifiers often are used under conditions where they must be intermittently gated into operative and inoperative states according to particular circumstances. In a computer memory system, for example, the sense amplifiers which are associated with the common bit-sense lines of the array must be rendered unresponsive to any signals that may exist on these lines during the write operations of the memory. During read operations, however, the sense amplifiers must respond to the output signals generated in the bit-sense lines. Thus, it is necessary to switch or gate the sense amplifiers into responsive or unresponsive states according to the particular operating conditions of the memory system. Examples of other situations in which gated amplifiers are employed could readily be given.

There is a rapidly growing interest in the use of low-cost, compact, integrated circuitry using transistors as active elements. Such circuitry must meet many special requirements. Among other thnigs, it is desirable that successive stages of the integrated circuit apparatus be directly coupled to one another. Difficulties have been encountered heretofore in attempting to design a gated amplifier that can be directly coupled to a succeeding amplifier stage. Gating operations tend to vary the direct-current voltage levels at the output terminals of such an amplifier, thereby producing undesirable "gating noises." Once these gating noises have been introduced, they are difficult to eliminate from the amplified signals. Corrective measures of the kind which have been utilized in the past to eliminate gating noises are not conducive to the production of low-cost, compact circuitry of the integrated type.

An object of this invention is to provide an economically feasible way of gating at least one stage of a direct-coupled transistor amplifier without introducing noises into the amplified signal by reason of the gating operations.

Another object is to provide a gated transistor amplifier suitable for inclusion in integrated circuitry.

A further object is to provide a gated preamplifier which can be embodied in integrated circuit form and which can furnish dual outputs that are free of large gating noises.

The foregoing and other objects, features and advantages of the invention will be apparent from the following more particular description of a preferred embodiment of the invention, as illustrated in the accompanying drawing wherein the single figure is a circuit diagram of a gated dual preamplifier embodying the invention.

A preamplifier of the type shown is adapted for use as the first stage of a direct-coupled amplifier which is responsive to dual inputs. This preamplifier furnishes dual outputs, each of which is applied directly to an input terminal of the succeeding amplifier stage. As an example, the preamplifier may receive input signals respectively from a bit-sense line and a dummy sense line in a memory array. The bit-sense line furnishes true sense signals intermingled with unwanted signals, while the dummy sense line furnishes the unwanted signals alone. The unwanted signals in the two inputs, known as the "common-mode" signals, oppose and cancel each other in the amplifier circuit, while the amplified true signal remains. In some instances, the inputs to the amplifier may contain differential-mode signals which are to be amplified, or they may be signals which are completely independent of each other. The gating principle herein disclosed is also adapted to be embodied in a single-input amplifier.

Referring now to the illustrated circuit diagram, the preamplifier therein shown has two input-output amplifying transistors T1 and T2. These transistors preferably are of the bipolar NPN type, and their base electrodes respectively are connected to the input terminals 11 and 12 of the amplifier, which normally are at a D.C. ground potential. The collector electrodes of the transistors T1 and T2, respectively, are connected to the output terminals 21 and 22 of the amplifier, and they also are connected respectively by the load resistors R1 and R2 to the high-voltage terminal +V1 of the voltage supply.

The emitter electrodes of the transistors T1 and T2 are connected to the collector of a transistor T3, preferably of the NPN type, which is arranged in a common-base circuit appropriately biased so that T3 has a normally conducting state. The transistor T3 is one of two switching or gating transistors T3 and T4, the latter of which will be described presently. The emitters of transistors T3 and T4 are connected to the collector of a bipolar NPN transistor T5, which is arranged in a common-base circuit that is appropriately biased to provide a high-impedance direct-current path through the transistor T5 to the negative terminal −V2 of the power supply. The transistors T1 and T2 provide low-impedance signal return paths for each other through their emitter-base junctions while these two transistors are in their conductive states.

The gating transistor T4, like the other transistors is of the NPN conductivity type. Its base is connected to the gating terminal G, to which positive-going gate voltage pulses are applied during those periods when it is desired to render the amplifier unresponsive to its input signals. Such gate pulses render T4 conductive. At other times, the transistor T4 is in a nonconducting or low-conductivity state. Its collector is connected through resistors R3 and R4, respectively to the aforesaid output terminals 21 and 22. The emitter of T4, as previously mentioned, is connected to the emitter of T3 and to the collector of T5.

The output terminals 21 and 22 are adapted to be connected directly (i.e., not through the medium of capacitors or other D.C. isolating elements) to the input terminals of a succeeding amplifier stage (not shown). During periods when the amplifier is being gated alternately into its unresponsive and responsive states, the direct-current voltage levels or potentials at the output terminals 21 and 22 should remain essentially constant. Otherwise, unwanted D.C. voltage shifts would occur at these output terminals and thereby introduce "gating noises" into the amplified signals that are being fed to the next amplifying stage. The present arrangement prevents, or substantially prevents, the occurrence of gating noises in the following manner:

When a positive-going gate pulse is applied to the gating terminal G of the amplifier, which is connected to the base of T4, the transistor T4 thereupon is rendered conductive. This raises the voltage level of the emitters of T3 and T4 sufficiently to reverse-bias the emitter-base junction of T3 and thereby render T3 nonconductive. This in turn renders T1 and T2 nonconductive and therefore unresponsive to the input signals, thus turning the amplifier off. The resistances of the resistors R3 and R4 must be of such magnitude as to isolate the signals at the collectors of T1 and T2 from each other. The direct current that normally would flow through transistors T1, T2 and T3 now flows instead through transistor T4 in the alternative current path that has been established by the latter transistor in response to the gate pulse. The establishment of this shunt path by T4 prevents the D.C. potential at the output terminals 21 and 22 from shifting and thereby introducing a gating noise into the outputs. Transistors T3 and T4 thus function, in effect, as a single-pole double-throw switch that normally connects point 30 (collector of T5) to point 31 (emitters of T1 and T2), but which is effective under the influence of a gate pulse for disconnecting point 30 from point 31 and connecting it instead to point 32 at the junction of resistors R3 and R4. A converse switching action occurs upon the termination of the gate pulse. Transistor T5 functions at all times to maintain the direct current flowing through the amplifier circuit at a substantially constant level. When the gate pulse terminates, the amplifier reverts to its normal state (in which T4 is nonconductive) without altering the D.C. voltage level at the output terminals 21 and 22.

The illustrated preamplifier offers many advantages. It utilizes a small number of circuit elements, consisting of resistors as the passive elements and transistors of the same conductivity type as the active elements. The circuit arrangement is simple and is well adapted for integration. Noise generated by the gating pulses is negligible. Signal rejection during the gating interval is very high, and for common-mode signals it is extremely high. An amplifier which is designed to utilize the illustrated preamplifier requires only a small number of stages, making the total power dissipation of the amplifier quite low. Another advantage of the disclosed device is the fact that the gate pulses can be used for decoding purposes. For example, where two or more words of information are being read simultaneously out of memory, the preamplifiers associated with the unwanted word or words can be turned off, so that only a selected one of the sensed words is amplified.

If it is desired that the illustrated preamplifier function as a single-input amplifier, one of the two input terminals (e.g., 12) is continuously grounded. The amplifying transistor (e.g., T2) which is connected to this terminal then merely serves as a low-impedance signal return for the active amplifying transistor (e.g., T1). The modified circuit functions as before to stabilize the D.C. potential of the active output terminal (21) during gating operations.

While the invention has been particularly shown and described with reference to a preferred embodiment thereof, it will be understood by those skilled in the art that various changes in form and details may be made therein without departing from the spirit and scope of the invention.

What is claimed is:

1. In a gated signal amplifier which is operable from a direct-current voltage supply under the control of a pulsed gate voltage, the combination comprising:

at least one input terminal for receiving signals to be amplified;

at least one output terminal at which the amplified signals are manifested;

at least one transistor having base, emitter and collector electrodes, said base being connected to said input terminal, said collector being connected to said output terminal;

load resistance means connecting one side of said voltage supply to said collector;

impedance means connected at a first end thereof to the other side of said voltage supply, said impedance means affording a high-resistance path between said first end thereof and a second end thereof;

circuit means effective while said transistor is in a conductive state to provide a signal return path between said emitter and a point of reference potential in said voltage supply;

and gating means having portions thereof which are operable in response to the application and removal of gate voltage for establishing conductive paths alternately from said collector and said emitter to the second end of said impedance means, according to the presence or absence of gate voltage, whereby a conductive path is provided by said gating means between said collector and said impedance means at times when there is no conductive path between said emitter and said impedance means.

2. The combination set forth in claim 1, wherein the alternate paths afforded by said gating means are effective, in conjunction with said load resistance means and said impedance means, to maintain at a substantially constant level the direct-current component of the output terminal potential.

3. In a gated signal amplifier which is operable from a direct-current voltage supply under the control of a pulsed gate voltage, the combination comprising:

first and second input terminals;

first and second output terminals;

first and second transistors each having base, emitter and collector electrodes, the bases of said first and second transistors being connected respectively to said first and second input terminals, the collectors of said first and second transistors being connected respectively to said first and second output terminals;

first and second load resistors connecting one side of said voltage supply respectively to said first and second collectors;

impedance means connected at a first end thereof to the other side of said voltage supply, said impedance means affording a high-resistance path between said first end thereof and a second end thereof;

circuit means connecting the emitters of said first and second transistors to a first common point;

other circuit means connecting the collectors of said first and second transistors to a second common point;

and gating means having portions thereof which are operable in response to the application and removal of gate voltage for establishing conductive paths from the second end of said impedance means alternately to said first and second common points, according to the absence or presence of gate voltage, whereby a conductive path is provided by said gating means between said impedance means and the collectors of said first and second transistors at times when there is no conductive path between said impedance means and the emitters of said first and second transistors.

4. The combination set forth in claim 3, wherein the alternate paths afforded by said gating means are effective, in conjunction with said load resistors and said impedance means, to maintain at substantially constant levels the respective direct-current components of the output terminal potentials.

5. In a gated signal amplifier which is operable from a direct-current voltage supply under the control of a pulsed gate voltage, the combination comprising:

first and second input terminals;

first and second output terminals;

first and second transistors each having base, emitter and collector electrodes, the bases of said first and second transistors being connected respectively to said first and second input terminals, the collectors of said first and second transistors being connected respectively to said first and second output terminals;

first and second load resistors connecting one side of said voltage supply respectively to said first and second collectors;

impedance means connected at a first end thereof to the other side of said voltage supply, said impedance means affording a high-resistance path between said first end thereof and a second end thereof;

circuit means connecting the emitters of said first and second transistors to a first common point;

other circuit means connecting the collectors of said first and second transistors to a second common point; and gating means comprising:

a third transistor having a collector connected to said first common point, an emitter connected to said second end of said impedance means, and a base which is biased for rendering said third transistor normally conductive; and a fourth transistor normally in a nonconductive state having a collector connected to said second common point, an emitter connected to said second end of said impedance means, and a base responsive to the application of gate voltage thereto for rendering said fourth transistor conductive while such gate voltage is being applied, said third transistor being nonconductive while said fourth transistor is conductive and said third transistor being conductive while said fourth transistor is nonconductive, said gating means, in response to the application and removal of gate voltage, establishing conductive paths from the second end of said impedance means alternately to said first and second common points, according to the absence or presence of gate voltage, whereby a conductive path is provided by said gating means between said impedance means and the collectors of said first and second transistors at times when there is no conductive path between said impedance means and the emitters of said first and second transistors.

6. The combination set forth in claim, 5 wherein said impedance means includes a fifth transistor having an emitter at its first end, a collector at its second end, and a base which is appropriately biased to maintain a high resistance between said first and second ends.

References Cited

UNITED STATES PATENTS

| | | | |
|---|---|---|---|
| 3,081,405 | 3/1963 | Hovey et al. | |
| 3,106,433 | 10/1963 | Meadows et al. ---- | 328—101 X |
| 3,116,476 | 12/1963 | Goldstick. | |
| 3,123,721 | 3/1964 | Kaufman ---------- | 307—254 X |
| 3,188,491 | 6/1965 | La Bahn. | |
| 3,268,829 | 8/1966 | Quinlan. | |
| 3,275,945 | 9/1966 | Walker et al. | |

DONALD D. FORRER, Primary Examiner

U.S. Cl. X.R.

307—217, 296